US007180861B2

(12) United States Patent
Janczak

(10) Patent No.: US 7,180,861 B2
(45) Date of Patent: Feb. 20, 2007

(54) STRICT PRIORITY DISTRIBUTED COORDINATION FUNCTION IN WIRELESS NETWORKS

(75) Inventor: Tomasz Janczak, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 950 days.

(21) Appl. No.: 09/991,281

(22) Filed: Nov. 15, 2001

(65) Prior Publication Data

US 2003/0090999 A1 May 15, 2003
US 2006/0083166 A9 Apr. 20, 2006

Related U.S. Application Data

(60) Provisional application No. 60/307,542, filed on Jul. 23, 2001.

(51) Int. Cl.
*H04J 1/16* (2006.01)
*H04J 3/14* (2006.01)

(52) U.S. Cl. .............. 370/235; 370/338; 370/376; 370/395.21; 370/395.42; 370/412; 370/445; 370/458

(58) Field of Classification Search ............ 370/235, 370/395.42, 385.21, 338, 376, 412, 418, 370/445, 458
See application file for complete search history.

(56) References Cited

U.S. PATENT DOCUMENTS 4,470,112 A * 9/1984 Dimmick ............... 710/116

| | | | |
|---|---|---|---|
| 5,440,553 A * | 8/1995 | Widjaja et al. | 370/411 |
| 6,791,990 B1 * | 9/2004 | Collins et al. | 370/412 |
| 2002/0118683 A1 * | 8/2002 | Narayana et al. | 370/395.42 |
| 2002/0126692 A1 * | 9/2002 | Haartsen | 370/450 |
| 2003/0035396 A1 * | 2/2003 | Haartsen et al. | 370/336 |

OTHER PUBLICATIONS

Aad I., Castellucia C.: "Introducing Service Differentiation into IEEE 802.11", Proceedings of Fifth IEEE Symposium on Computers and Communications, ISCC 2000.
ETSI "Broadband Radio Access Networks (BRAN); High Performance Radio Local Area Network (HIPERLAN) Type 1; Functional secification", Jul. 1998.
IEEE 802.11 Tge, "Proposed Text for p-DCF Contention Access Enhancement", TR-01/138 at http:www.ieee802.org/11/, Mar. 2001.
IEEE 802.11 Tge, "VDCF Proposed Draft Text", TR-01/131 at http://www.ieee802.11.org/11, Mar. 2001.
IEEE 802.11 Tge, "proposed Normative Text for TCMA with Backoff Adaptaion", TR-01.135 at http://www.ieee802.11.org/11, Mar. 2001.
IEEE Std 802.11 "Wireless LAN Medium Access Control (MAC) and Physical Layer (PHY) specifications", 1999 Edition.

(Continued)

*Primary Examiner*—John Pezzlo
*Assistant Examiner*—Inder Pal Mehra
(74) *Attorney, Agent, or Firm*—Philip A. Pedigo

(57) ABSTRACT

A system and method for prioritizing the transmission of packets in a wireless local area network. A station selects a packet from local priority queuing and identifies the priority bits of the packet. The station declares the priority of the selected packet based on the binary value of the priority bits. If the station detects that another station has selected a packet with a higher priority, then the station ceases to contend for transmission during the current transmission cycle.

14 Claims, 7 Drawing Sheets

OTHER PUBLICATIONS

Sharewave, "Whitecap Network Protocols", http://www.sharewave.com.

Sharewave, "Home Optimixed Wi-Fi Wireless Network Protocol", http://www.sharewave.com.

Sobrinho J. and Krishnakumar A., "Quality-of-Service in Ad Hoc Carrier Sense Multiple Access Wireless Networks," IEEE Journal on Selected Areas in Communications, vol. 17, Issue 8, pp. 1353-1368, Aug. 1999.

* cited by examiner

STRICT PRIORITY DISTRIBUTED COORDINATION FUNCTION IN WIRELESS NETWORKS

RELATED APPLICATIONS

This application claims the benefit of U.S. Provisional Application Ser. No. 60/307,542 filed on Jul. 23, 2001.

FIELD OF THE INVENTION

This invention relates to wireless data communication systems. More particularly, this invention relates to a method of prioritizing packet transmissions between stations in a wireless local area network.

BACKGROUND OF THE INVENTION

Wireless local area networks (WLAN) are generally known in the art. For example, one embodiment of a WLAN is described in the IEEE 802.11 standard, entitled "Wireless LAN Medium Access Control (MAC) and Physical Layer (PHY) Specifications, 1999 Edition." The IEEE 802.11 standard specifies both the PHY layer and the MAC sub-layer of the Open Systems Interconnection (OSI) Reference Model of the International Standards Organization (ISO).

The MAC protocol specified by the IEEE 802.11 standard can operate in a distributed coordination function (DCF) mode. The DCF mode governs access to the communications medium through a carrier sense multiple access with collision avoidance (CSMA/CA) scheme. FIG. 1 illustrates the DCF mode's CSMA/CA scheme. According to the CSMA/CA scheme, a station generally cannot transmit a frame until it senses that the channel has been idle for at least a DCF inter frame space (DIFS) 110. Because more than one station may be ready to transmit a packet once a DIFS has transpired, the DCF mode employs a collision avoidance mechanism. The collision avoidance mechanism requires all stations to generate a random backoff period 120 (Backoff Time) for an additional deferral time before transmitting a packet. The station that generates the shortest Backoff Time transmits a packet when the Backoff Time has transpired 130. The other stations in the WLAN cease to contend for the communications medium once they detect that the communications medium is busy 140.

The CSMA/CA scheme used by the DCF mode is a best-effort service because it does not provide a mechanism to ensure quality of service (QoS) for time-bounded packet transmissions. Multimedia content that is transmitted by a best-effort service packet transmission method may be subject to unpredictable delays and jitters. These delays and jitters can be greatly reduced if multimedia packets are given priority by the packet transmission method.

IEEE 802.11 Task Group E has been working to define an enhanced DCF mode. Task Group E has primarily focused on two methods for enhancing the DCF mode. The first method is to increase the length of the average Backoff Time for stations seeking to transmit low priority packets. The second method is to require stations with low priority packets to wait longer than a DIFS before generating a Backoff Time. Each of these methods increases the average time a station with a low priority packet must wait before transmitting the packet.

While these proposals privilege high priority packets in accessing the communications medium, they also raise new concerns. First, due to the random nature of the Backoff Time, neither of these methods guarantee that a high priority packet will always be transmitted before a low priority packet. Also, since Backoff Times are, on average, longer for low priority packets than under the standard DCF mode, the network as a whole exhibits longer delays for typical packet transmission.

The European Telecommunications Standards Institute (ETSI) has specified a standard for WLANs that is similar in scope to the IEEE 802.11 standard. The ETSI standard is named the High Performance Radio Local Area Network protocol (HIPERLAN/1). Like the IEEE 802.11 standard, HIPERLAN/1 specifies a slotted system, that is, transmission attempts take place at discrete instances in time. A slot is the basic time unit in a slotted system. HIPERLAN/1 provides for the prioritization of the transmission of packets through an Elimination Yield Non-pre-emptive Priority Multiple Access (EY-NPMA) mechanism.

FIG. 2 illustrates that the EY-NPMA mechanism comprises three phases: prioritization 210, contention 220, and transmission 230. The prioritization phase lasts from one to five slot intervals 210. Each slot interval of the prioritization phase corresponds with one of the five priority levels defined by HIPERLAN/1. The first slot interval of the prioritization phase 240 corresponds with the highest priority a packet can have and the fifth slot level 250 corresponds with the lowest priority a packet can have. A station that is ready to send a packet will transmit a signal one slot interval in duration, during the slot interval that corresponds with the priority level of the packet 250. When a station transmits during one of the slot intervals of the prioritization phase, all stations not concurrently transmitting cease to contend for transmission. Because the slot intervals are arranged in decreasing order of priority, the first station to transmit is necessarily ready to transmit a packet of higher priority than those stations that have not yet transmitted. Thus, EY-NPMA ensures that higher priority packets are transmitted before lower priority packets. The length of the EY-NPMA prioritization phase, however, can vary with each transmission cycle.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Embodiments of a system and method for prioritizing packet transmissions among stations in a WLAN are described in detail herein. For the purposes of the invention, a station is any device that can be connected to a WLAN including, but not limited to, personal computers, handheld scanners, printers, personal digital assistants, etc. In the following description, numerous specific details are provided in order to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The invention provides a method for strictly prioritizing the transmission of packets between stations in a WLAN. In particular, this invention can be used to enhance the DCF mode of an IEEE 802.11 compliant WLAN. The invention, however, is not limited to IEEE 802.11 compliant systems. The invention ensures that higher priority traffic will always be transmitted before lower priority traffic. Further, unlike other methods for enhancing the DCF mode, this invention does not increase the MAC overhead because it does not increase the average Backoff Time for low priority traffic.

Figure 1:
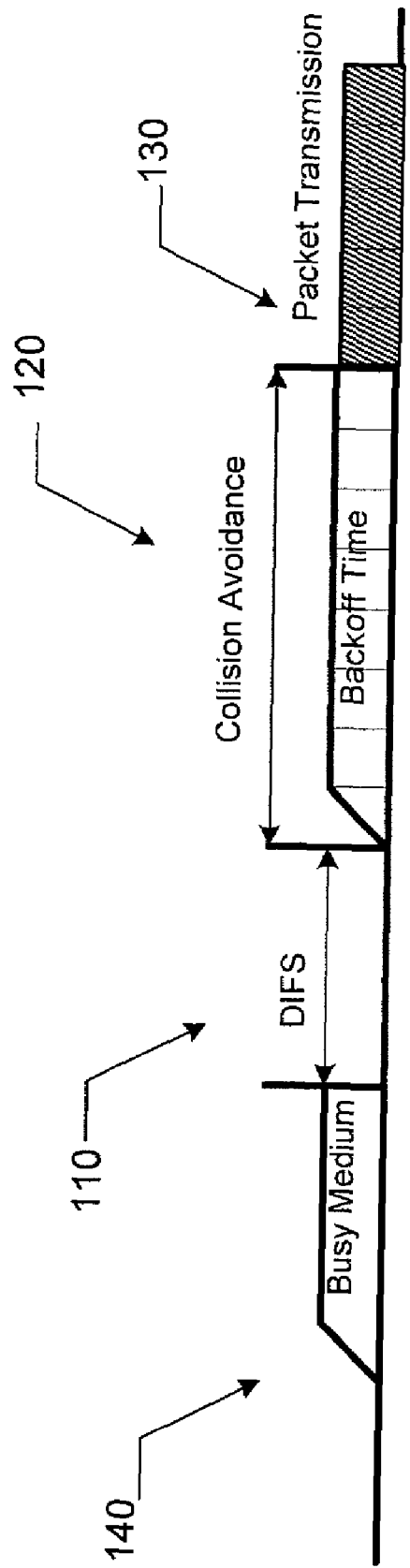
FIG. 1 illustrates access to the communications medium under the IEEE 802.11 standard while operating in the DCF mode.
Figure 2:
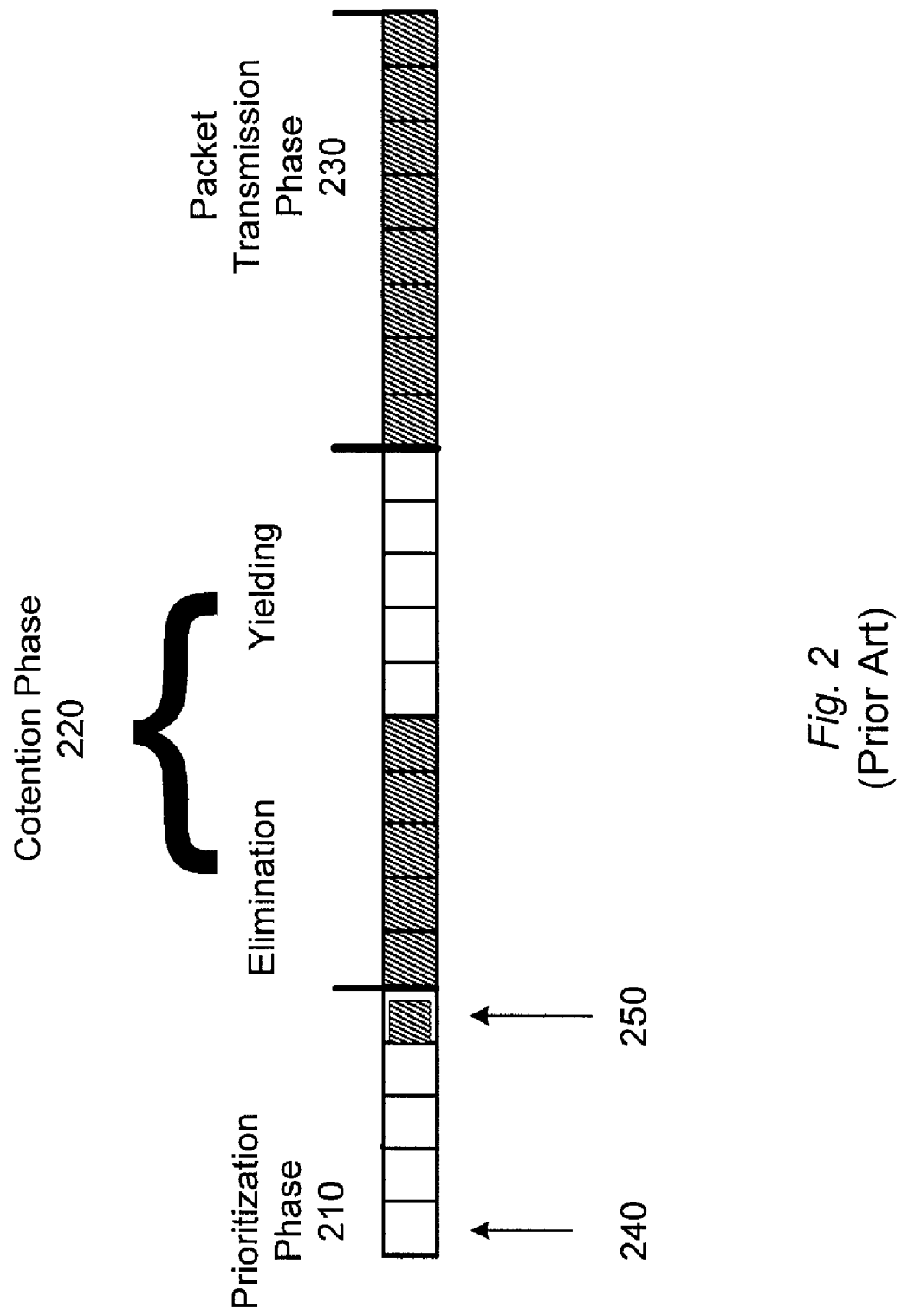
FIG. 2 illustrates the EY-NPMA mechanism according to HIPERLAN/1.
Figure 3:
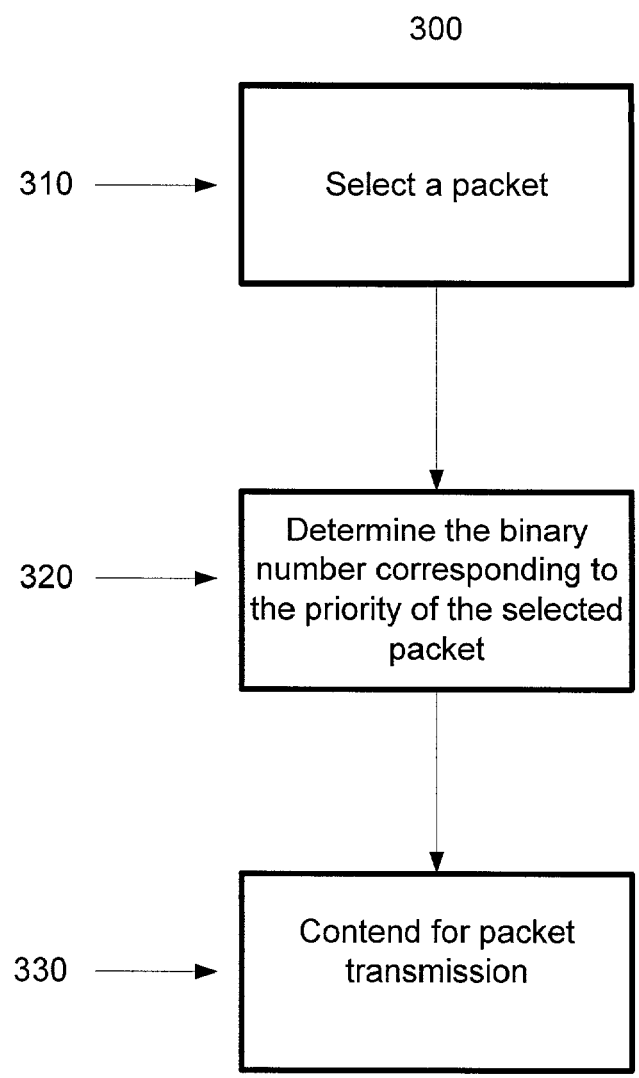
FIG. 3 illustrates one embodiment of the strict priority DCF mode algorithm.

FIG. 3 shows embodiment 300 of the invention. Referring to reference numeral 310, a station within a WLAN selects a packet to transmit. Generally, the station will have more than one packet that is ready to be transmitted and the packets within a station will have varying priorities. The station selects the highest priority packet from the packets that are ready to be transmitted. The station can use one of a number of well-known methods to select the highest priority packet. For example, the station can maintain separate output buffers for storing packets of different, or a range of, priorities. See, e.g., ISO/IEC 15802-3: 1998 ANSI/IEEE Std 802.1D, 1998 Edition, 7.7.3 (Queuing packets by priority in a LAN bridge). Accordingly, when a station is ready to select a packet for transmission, it searches the local output buffers for a packet, starting with the highest priority buffer.

Referring to reference numeral 320, the station determines a binary number corresponding to the priority of the selected packet. A person skilled in the art will appreciate that processes 310 and 320 can be performed in a different order and still be within the scope of the invention. Protocols corresponding to layers of the OSI model communicate with each other via service primitives. In the OSI model, the Logic Link Control layer (LLC) protocol is the sub-layer above the MAC protocol. The LLC protocol uses the MA-UNITDATA.request primitive to direct the MAC protocol operating in a first station to transfer a packet to the MAC protocol operating in a second station (or a number of stations). One of the parameters of the MA-UNITDATA.request primitive is a priority parameter. According to the IEEE 802.11 standard, the priority parameter of the MA-UNITDATA.request primitive can be set to one of two values: contention or contention-free. If the priority parameter is set to contention, the station's MAC protocol will operate in the DCF mode. One embodiment of the invention changes the way the priority parameter is used. According to one embodiment of the invention, the priority parameter contains the binary number corresponding to the priority of the packet associated with the primitive. Thus, the priority parameter is used to inform the MAC protocol of a packet's priority. It is appreciated that the invention can implement other ways of informing the MAC protocol of a packet's priority.

Referring to reference numeral 330, the station contends with other stations within the WLAN for packet transmission. In accord with the invention, a station within a WLAN encodes the priority of a packet as a binary number. The station informs other stations within the WLAN of the binary number corresponding to the priority of the packet the station has selected to transmit. In one embodiment of the invention, the binary number corresponding to the priority of the selected packet is represented by a series of binary digits (hereinafter "bits"). In FIG. 1 through FIG. 7, a shaded slot interval is used to designate a non-zero bit. According to the same embodiment, the process of informing the other stations of the priority of the selected packet is done on a bit-by-bit basis.

Figure 4:
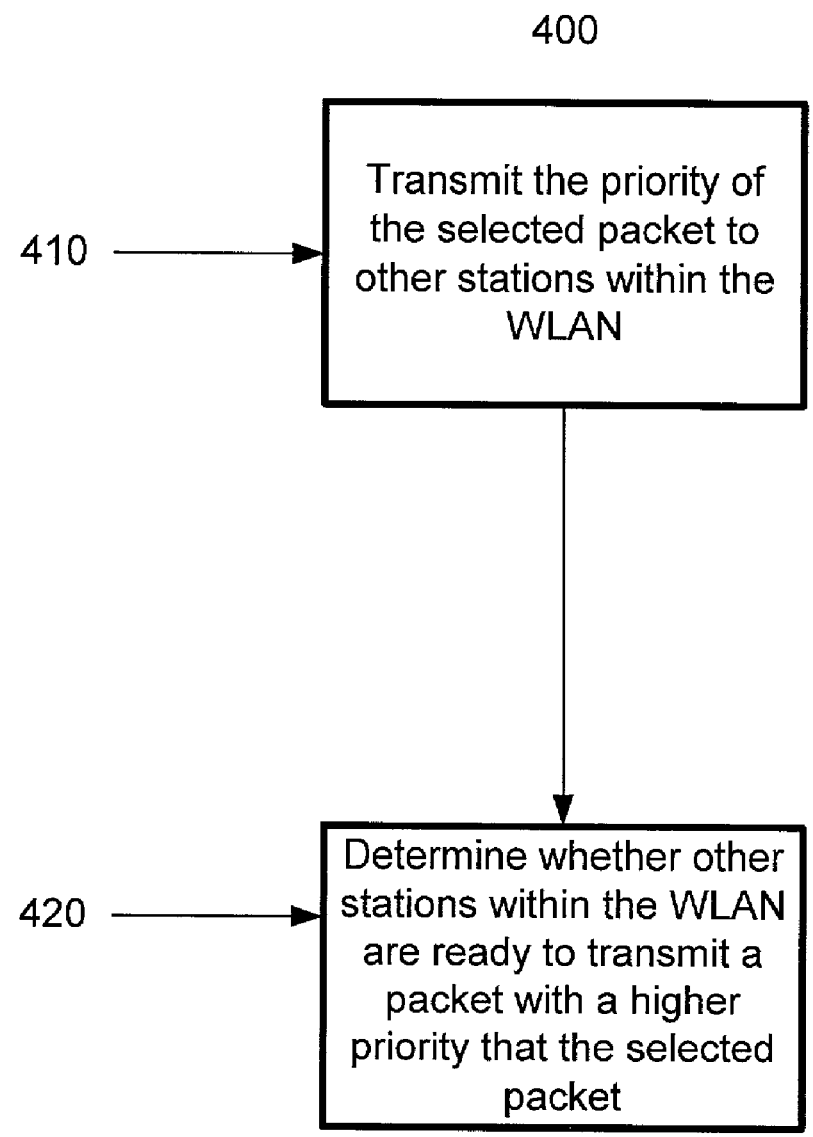
FIG. 4 illustrates one embodiment of the contention process.

FIG. 4 shows one embodiment of the contention process. A person skilled in the art will appreciate that processes 410 and 420 can be performed in a different order and still be within the scope of this invention. Generally, the process of contention comprises both transmitting the priority of the selected packet 410 and determining whether other stations within the WLAN are ready to transmit a higher priority packet 420. According to one embodiment of the invention, the station transmits each non-zero priority bit and senses the communications medium for the transmissions of other stations for each priority bit that is zero. The station will cease contending for transmission if, while sensing the communications medium, it detects a transmission from another station.

Figure 5:
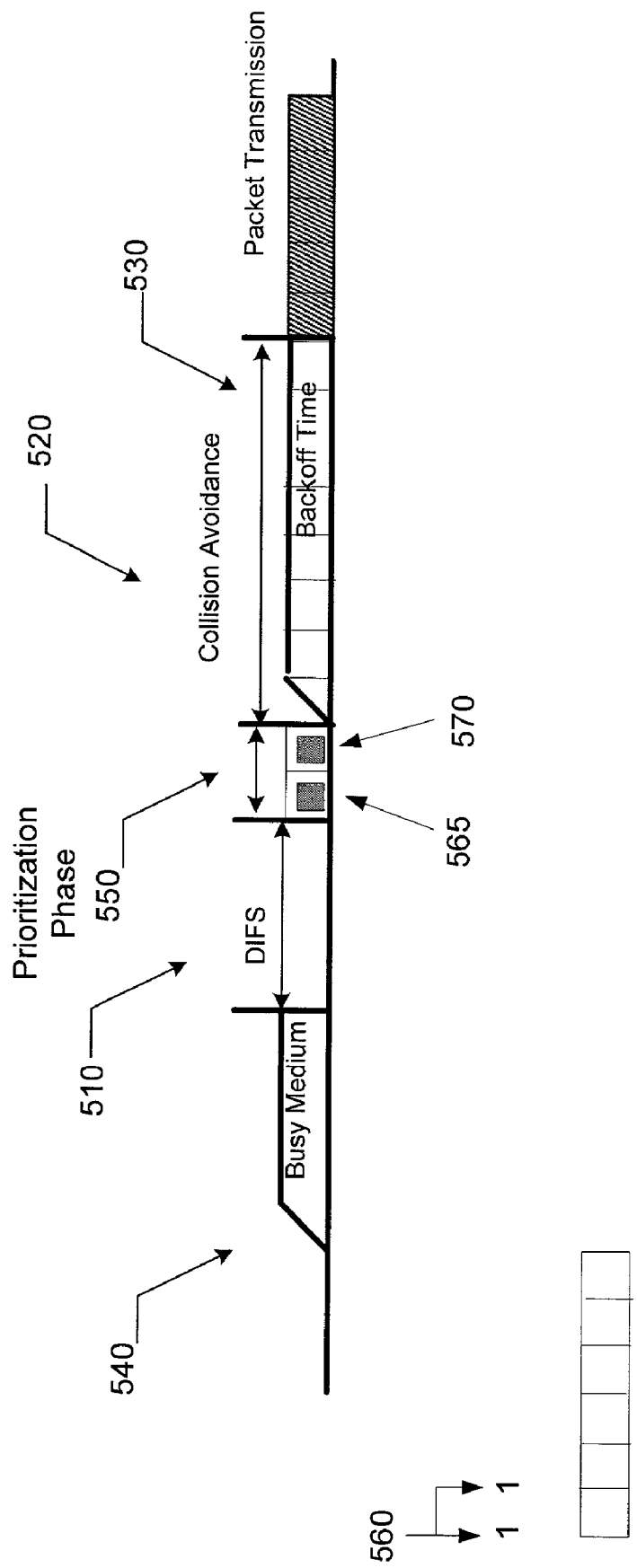
FIG. 5 illustrates access to the communications medium under the strict priority DCF mode algorithm.

FIG. 5 illustrates the contention process. A station informs other stations within a WLAN of the priority of the selected packet during a prioritization phase 550. A packet's priority is encoded in a two bit binary number 560. The length of the prioritization phase for this embodiment is, therefore, two slot intervals. Referring to reference numeral 560, an exemplary packet 575 has a priority represented by two priority bits having the value 11 (binary). In one embodiment, the station transmits during the prioritization phase, a bit per slot interval for each non-zero priority bit. An example of transmission during a slot interval can be found in "Broadband Radio Access Networks (BRAN); High Performance Radio Local Area Network (HIPERLAN/1) Type 1; Functional specification," July 1998. Thus, during the first slot interval of prioritization phase 550, the station ready to send packet 575 transmits a bit 565 over the communications medium. The transmission lasts one slot interval. Similarly, during the second slot interval 570, the station transmits another bit for one interval to signify that the second bit of the binary number representing the priority of packet 575 is non-zero. After the second slot interval, the station has transmitted two bits, each bit transmitted during one slot interval. Because each bit corresponds to a non-zero priority bit, the station informs the other stations within the WLAN that it is ready send a packet with a priority of 11 (binary).

Further as part of the contention process 400, the station determines whether other stations within the WLAN are ready to transmit a packet with a higher priority than the packet selected by the station. In one embodiment, the station makes this determination in conjunction with transmitting the priority of a selected packet during the prioritization phase. Accordingly, the station determines whether the most significant priority bit of the packet it is ready to transmit is zero or non-zero. As stated above, if the bit is non-zero, the station transmits a bit during one slot interval. Alternatively, if the most significant priority bit is zero, the station senses the communications medium for one slot interval to determine whether another station is transmitting a non-zero bit. An example of a MAC protocol sensing the communications medium can be found in chapter 12.3.5.10 of the IEEE 802.11 standard. The station, according to this embodiment, ceases to contend for packet transmission if it detects that another station (or a number of stations) is transmitting a non-zero bit over the communications medium while the station is sensing the medium.

Figure 6:
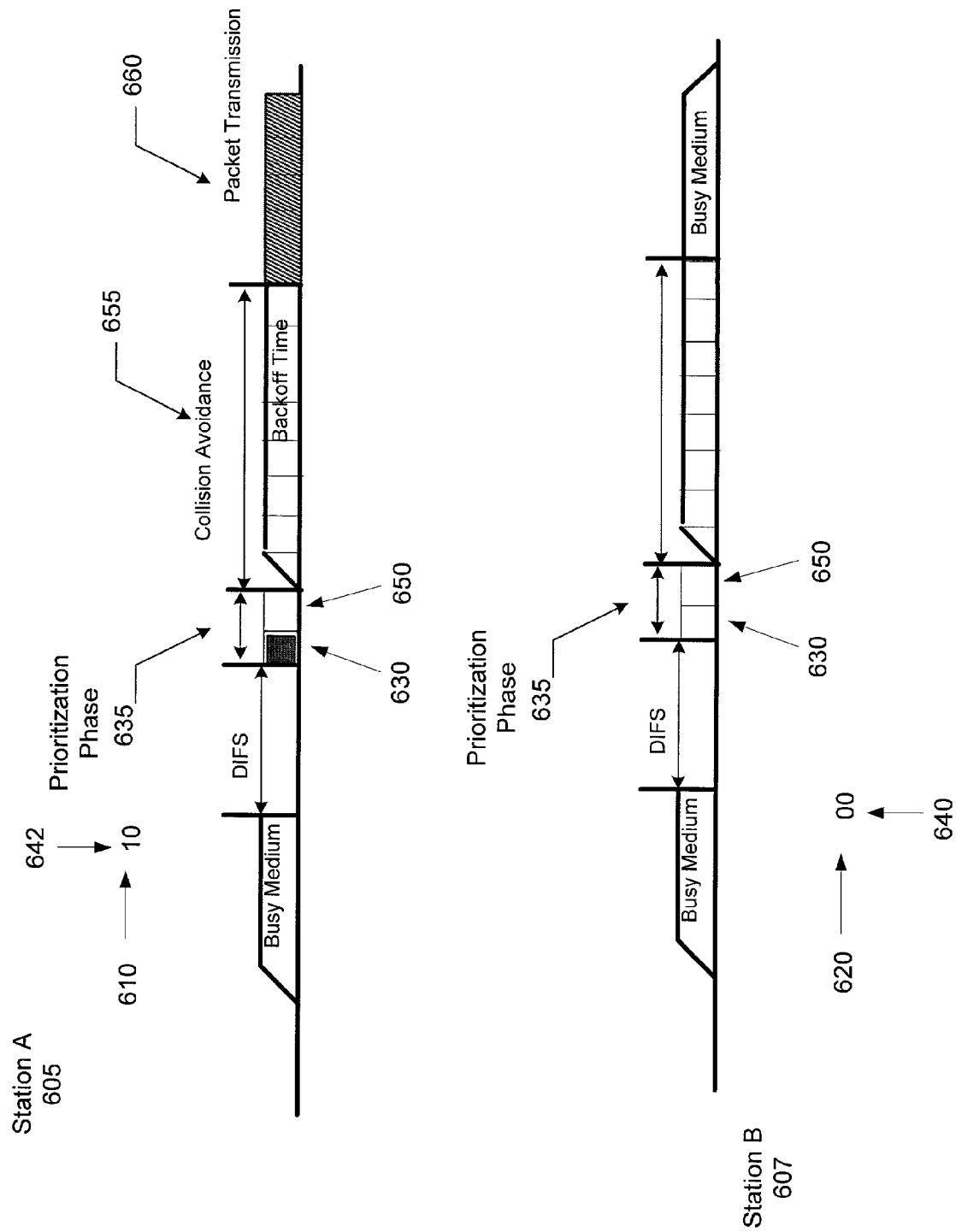
FIG. 6 illustrates prioritization of the transmission of packets between two stations in a WLAN, according to the strict priority DCF mode algorithm.

FIG. 6 shows Station A 605 and Station B 607, each ready to transmit a packet. Reference numerals 610 and 620 show the priorities of the packets. Referring to reference numeral 610, Station A selects a packet with a priority of 10 (binary) for transmission. Similarly, Station B selects a packet with a priority of 00 (binary) 620 for transmission. In one embodiment of the present invention, stations A and B enter the prioritization phase 635 after detecting that the communications medium is free for at least a DIFS.

During the first slot interval 630 of the prioritization phase, Station B senses the communications medium because the first priority bit 640 corresponding to the packet Station B has selected to transmit is set to zero. In contrast, Station A transmits a bit during the first slot interval 630 because the first priority bit 642 corresponding to the packet it has selected to transmit is set to non-zero. Station B determines that Station A is ready to send a packet with a higher priority because Station B detects that Station A is transmitting a bit during the first slot interval 630. In one embodiment of the invention, Station B ceases to contend for transmission after it determines that Station A is ready to send a packet with a higher priority than the priority of the packet Station B has selected for transmission. At slot interval 650, Station A senses the communications medium to determine whether there is a station within the WLAN that is ready to transmit a packet with a higher priority than the packet Station A has selected for transmission. After sensing the communications medium at slot 650 and failing to detect a one slot interval bit transmission from another station, Station A generates a Backoff Time 655. Finally, after the Backoff Time has transpired, Station A transmits at 660 the packet it has selected.

Figure 7:
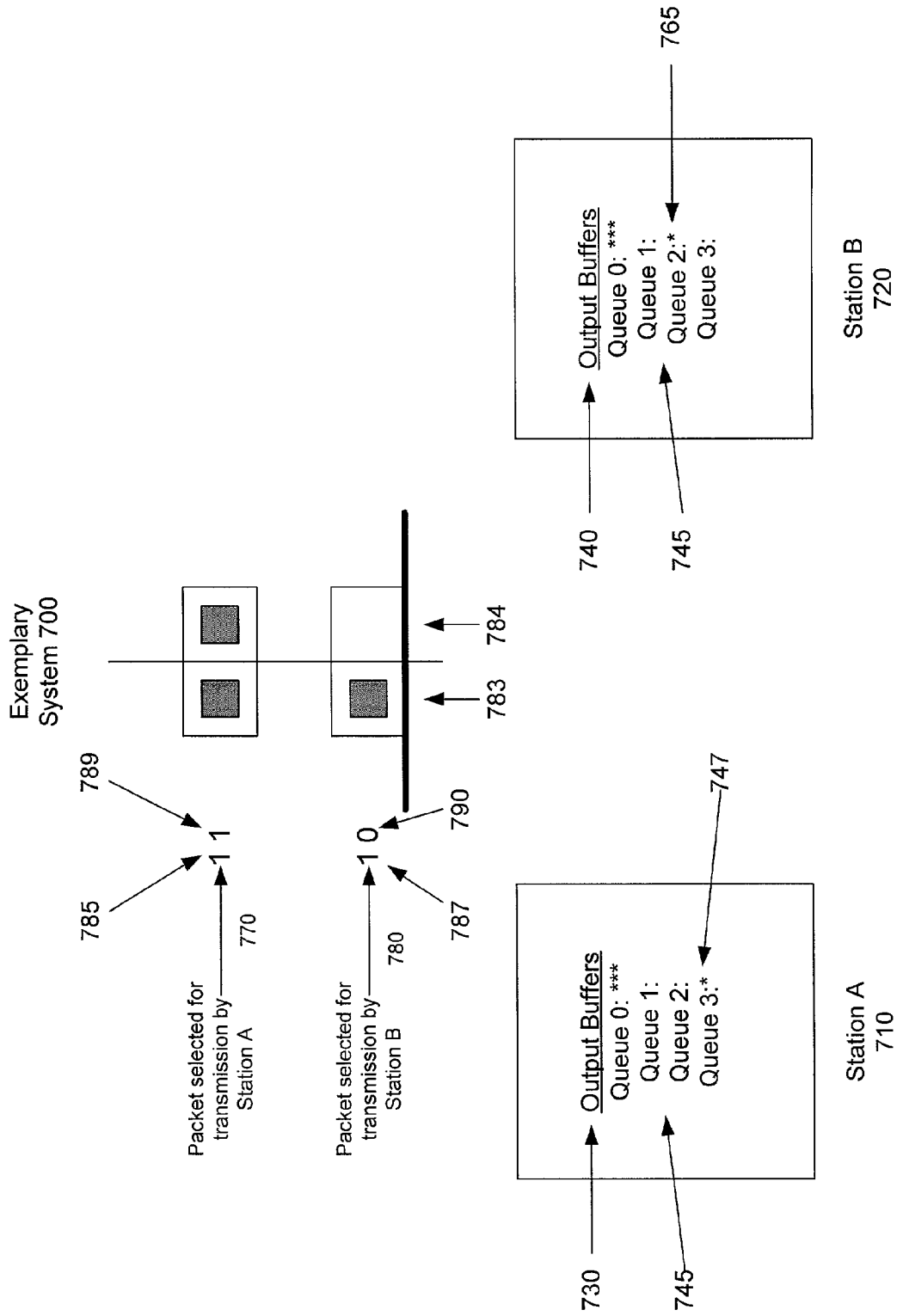
FIG. 7 illustrates an exemplary system implementing the strict priority DCF mode algorithm.

FIG. 7 illustrates an exemplary embodiment of a system 700 for implementing method 300 of prioritizing the transmission of packets between stations in a WLAN. The system 700 includes Station A 710 and Station B 720. Station A and Station B are connected together in a WLAN (not shown). Station A has output buffers 730 and Station B has output buffers 740. Referring to reference numeral 745, output buffers 730 and 740 each comprise packet queue 0 through packet queue 3. Each packet queue in 745 is maintained for packets of a particular priority. The priority of the packets within a queue corresponds with the queue number. For example, packet 747 in queue 3 of Station A has a priority of three. Similarly, the packet in queue 2 shown at 765 has a priority of two. In exemplary system 700, packets can have a priority ranging from zero to three, with three being the highest possible priority.

System 700 implements method 300 as follows. At process 310, Station A searches its output buffers 745 for a packet that is ready to be transmitted. Station A first searches queue 3 for a packet because queue 3 is maintained for the highest priority packets, in this case, packets of priority three. Station A selects packet 747 after searching queue 3 because packet 747 is the highest priority packet. Similarly, Station B first searches queue 3and, finding queue 3empty next searches queue 2 at 765 for a packet to transmit. Station B selects packet 765 for transmission because packet 765 has the highest priority of any packet that Station B is ready to transmit.

Station A and Station B determine, at 320, the priorities of the packets selected for transmission. As stated above, in one embodiment of the invention, the priority of the packet is encoded as a binary number in the priority parameter of the MA-UNITDATA.request primitive associated with the packet. In the exemplary embodiment system 700, the priorities of packets 747 and 765 are encoded as two digit binary numbers. A person skilled in the art will appreciate that priority can be encoded in a binary number comprising virtually any number of digits. Referring to reference numeral 770, station A determines that packet 747 has a priority of 11 (binary). Similarly, Station B determines that packet 765 has a priority of 10 (binary) at 780.

Station A and Station B contend for packet transmission at 330. According to one embodiment, contention occurs during a prioritization phase shown by reference numeral 550 in FIG. 5. Referring now to both FIG. 5 and FIG. 7, Station A and Station B both enter the prioritization phase after they sense that the medium has been free for at least a DIFS 510. Because exemplary system 700 provides for four possible levels of packet priority, packet priority is encoded in a two digit binary number. Exemplary system 700, therefore, uses a prioritization phase that is two slot intervals long 783, 784.

Referring to reference numeral 783, both Station A and Station B transmit a bit during the first slot interval of the prioritization phase. Station A and Station B both transmit a bit because priority bit 785 and priority bit 787 are both non-zero. During the following slot interval 784, station A transmits a second bit for one slot interval because bit 789 is non-zero. Thus, Station A informs Station B that Station A is ready to send a packet with a priority of three.

Station B senses the medium during the second slot interval of the prioritization phase because priority bit 790 is zero. Station B detects that Station A is transmitting a bit during the second slot interval of the prioritization phase 784 and thereby determines that Station A is ready to send a packet that is of higher priority than the packet that Station B has selected. Therefore, according to one embodiment of the present invention, Station B ceases to contend for transmission after the second slot interval of the prioritization phase.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
    selecting a packet;
    determining a binary number corresponding to a priority of the selected packet, wherein the binary number comprises N digits and wherein a priority parameter of an MA-UNITDATA.request primitive contains the priority of the selected packet;
    contending for packet transmission, wherein a period of contention lasts N slot intervals.

2. The method of claim 1 wherein contending for packet transmission comprises:
    transmitting a bit for each one of the N digits of the binary number that is non-zero;
    sensing a communications medium during a time interval corresponding to each one of the N digits of the binary number that is zero.

3. The method of claim 2 wherein transmitting a bit comprises transmitting a bit, during one slot interval, for each one of the N digits of the binary number that is non-zero; and wherein sensing the communications medium comprises sensing the communications medium for one slot interval corresponding to each one of the N digits of the binary number that is zero.

4. The method of claim 1 wherein selecting the packet comprises selecting a highest priority packet that is ready to be transmitted.

5. The method of claim 1 wherein the determining the binary number corresponding to the priority of the selected packet comprises determining a two digit binary number.

6. The method of claim 5 wherein contending for packet transmission comprises:
    A) selecting a most significant digit of the two digit binary number;
    B) determining whether a selected digit of the two digit binary number is zero or non-zero;
    C) transmitting a bit, during one slot interval, if the selected digit of the binary number is non-zero;
    D) sensing a communications medium, during one slot interval, if the selected digit of the binary number is zero;
    E) ceasing to contend for packet transmission if another bit is detected while sensing the communications medium;
    F) selecting a least significant digit of the binary number if another bit is not detected while sensing the communications medium or if the most significant digit of the binary number is non-zero;
    G) repeating processes B through E on the least significant digit if the least significant digit is selected.

7. The method of claim 1 wherein the determining the binary number corresponding to the priority of the selected packet comprises determining a three digit binary number.

8. The method of claim 1 wherein contending for packet transmission comprises:
    A) selecting a most significant digit of the binary number;
    B) determining whether a selected digit of the binary number is zero or non-zero;
    C) transmitting a bit, during one slot interval, if the selected digit of the binary number is non-zero;
    D) sensing the communications medium, during one slot interval, if the selected digit of the binary number is zero;
    E) ceasing to contend for packet transmission if another bit is detected while sensing the communications medium;
    F) selecting a next most significant digit of the binary number if another bit is not detected while sensing the communications medium or if the selected digit of the binary number is non-zero;
    G) repeating processes B through F for each digit of the binary number.

9. An article of manufacture comprising:
    a machine accessible medium providing machine readable instructions that, when executed by a machine, cause the machine to:
    select a packet;
    determine a binary number corresponding to a priority of the selected packet, wherein a priority parameter of an MA-UNITDATA.request primitive contains the priority of the selected packet
    wherein the binary number comprises N digits;
    contend for packet transmission, wherein a period of contention lasts N slot intervals.

10. The article of manufacture of claim 9, wherein the machine readable instructions, that when executed by a machine, cause the machine to contend for packet transmission comprises machine readable instructions, that when executed, cause the machine to:
    transmit a bit for each one of the N digits of the binary number that is non-zero;
    sense a communications medium during a time interval corresponding to each one of the N digits of the binary number that is zero.

11. The article of manufacture of claim 10, wherein the machine readable instructions, that when executed by a machine, cause the machine to contend for packet transmission comprises machine accessible medium providing content that, when accessed by the machine, cause the machine to:
    transmit a bit, during one slot interval, for each one of the N digits of the binary number that is non-zero;
    sense the communications medium for one slot interval corresponding to each one of the N digits of the binary number that is zero.

12. The article of manufacture of claim 9, wherein the machine readable instructions, that when executed by a machine, cause the machine to determine the binary number comprises machine readable instructions, that when executed, cause the machine to:
    determine the binary number corresponding to the priority of the selected packet, wherein the binary number comprises two digits.

13. The article of manufacture of claim 12, wherein the machine readable instructions, that when executed by a machine, cause the machine to contend for packet transmission comprises machine readable instructions, that when executed, cause the machine to:
    A) select a most significant digit of the two digit binary number;
    B) determine whether the selected digit of the binary number is zero or non-zero;
    C) transmit a bit, during one slot interval, if the selected digit of the binary number is non-zero;
    D) sense the communications medium, during one slot interval, if the selected digit of the binary number is zero;

E) cease to contend for packet transmission if another bit is detected while sensing the communications medium;
F) select a least significant digit of the binary number if another bit is not detected while sensing the communications medium or if the most significant digit of the binary number is non-zero;
G) perform steps B through B on the least significant digit if the least significant digit is selected.

14. The article of manufacture of claim 9, wherein the machine readable instructions, that when executed by a machine, cause the machine to contend for packet transmission comprises machine readable instructions, that when executed, cause the machine to:
A) select a most significant digit of the binary number;
B) determine whether the selected digit of the binary number is zero or non-zero;
C) transmit a bit, during one slot interval, if the selected digit of the binary number is non-zero;
D) sense the communications medium, during one slot interval, if the selected digit of the binary number is zero;
E) cease to contend for packet transmission if another bit is detected while sensing the communications medium;
F) select a next most significant digit of the binary number if another bit is not detected while sensing the communications medium or if the selected digit of the binary number is non-zero;
G) repeat processes B through F for each digit of the binary number.

* * * * *